INVENTOR,
SIDNEY E. LONGMAN
BY Jacobi & Davidson
ATTORNEYS

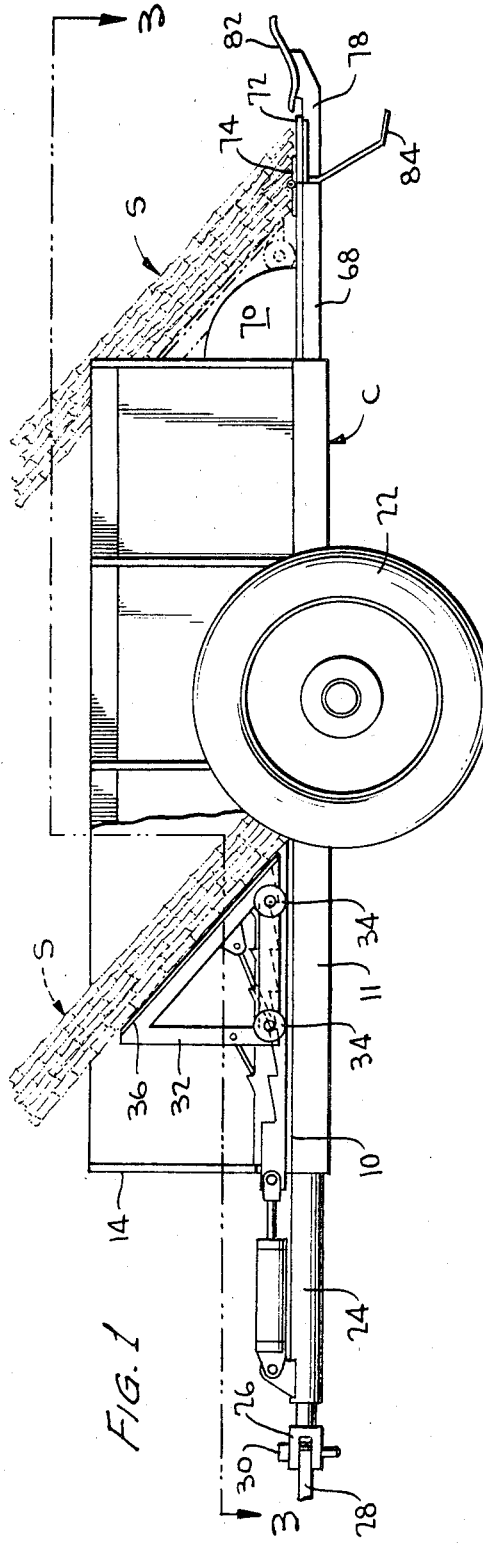
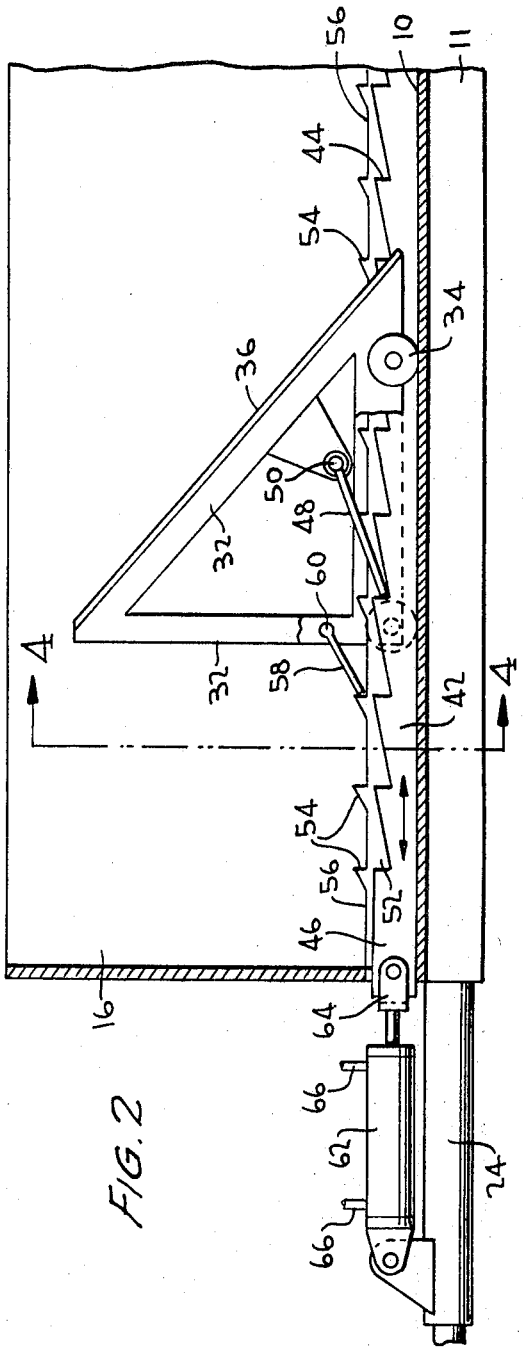

United States Patent Office 3,422,973
Patented Jan. 21, 1969

3,422,973
SUGARCANE PLANTING AID
Sidney E. Longman, R.F.D. 159B,
Franklin, La. 70538
Filed Oct. 11, 1966, Ser. No. 585,940
U.S. Cl. 214—83.1     9 Claims
Int. Cl. B60p 1/00; A01b 75/00

ABSTRACT OF THE DISCLOSURE

An improved sugarcane planting aid which increases the speed and efficiency of planting sugarcane. The sugarcane planting aid generally includes transverse partition means in a bin having side wall and front and rear ends. The partition means is movable longitudinally so as to advance the cane outwardly through the open rear end. A platform extends rearwardly from the bin and laterally in opposite directions beyond the side wall of the bin and cane confining means are secured to each side of the bin and the platform. Seat means are included on the platform for the workers who remove the cane from the apparatus and deposit it in the trench where it will be planted.

---

The invention relates generally to farm equipment and particularly to planting devices. It finds particular utility when employed as an aid in the planting of sugarcane.

The need for a sugarcane planting aid becomes apparent if present day labor costs are considered. When employing conventional methods of planting the sugarcane contained in a cart, four men are required to plant two rows of cane. Two of these men, stationed at the rear of a cart, respectively, drop the cane into parallel rows as the cart travels along. Two additional men are required to pass the cane to these first mentioned men, particularly when the cane which remains in the cart is beyond their reach. There thus remains a need for a simple, efficient and relatively inexpensive planting device which will materially reduce labor costs.

More specifically, one of the primary objects of the present invention is to provide a sugarcane planting aid in which the number of men required to unload a predetermined quantity of cane is materially reduced.

Another object of the invention is to provide a sugarcane planting device by which a greater number of rows of cane may be supplied with cane during a single pass of the cart.

Still another object of the invention is to provide a sugarcane planting aid wherein the number of carts required to deliver a given quantity of cane is reduced.

Yet another object of the invention is to produce a sugarcane planting aid according to the present teachings which is simple in construction and inexpensive to manufacture.

The invention will be better understood, and objects other than those set forth above, will become apparent after reading the following detailed description thereof. Such description refers to the annexed drawings presenting preferred and illustrative embodiments of the invention.

In the drawings:

FIGURE 1 is a side elevation of a device constructed in accordance with the present invention showing a portion of the cart sidewall broken away;

FIGURE 2 is a longitudinal section through the device showing the cane advancing mechanism in elevation;

Figure 3:
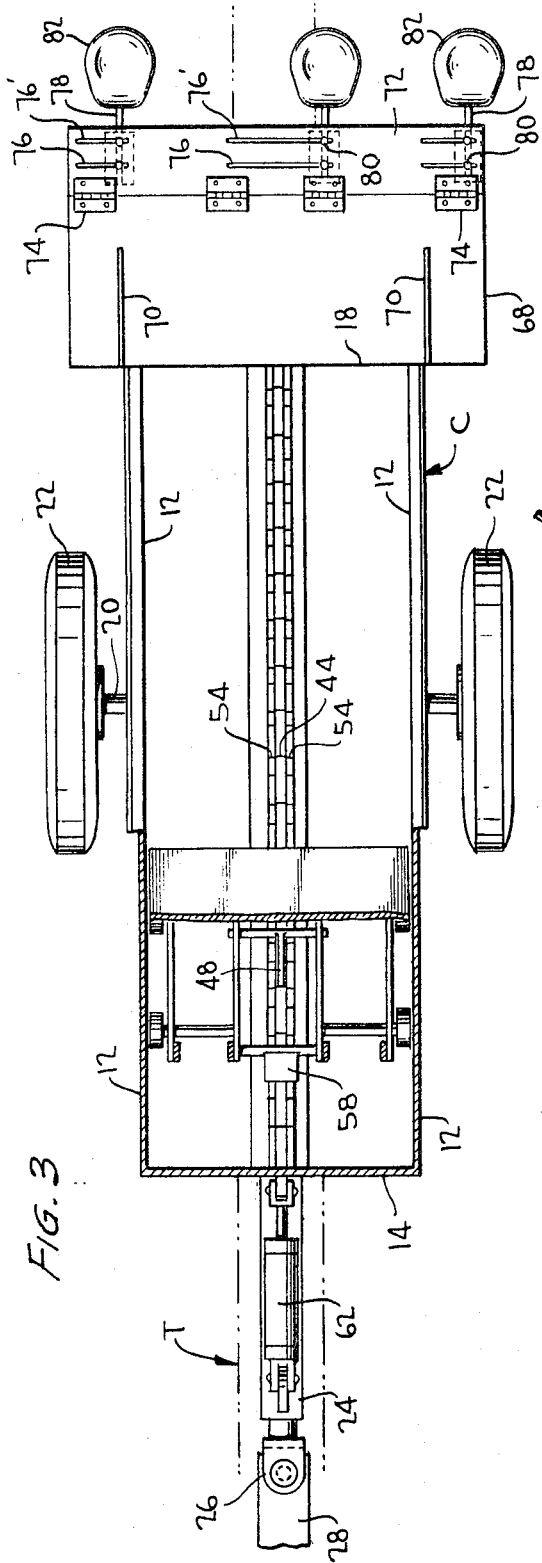
FIGURE 3 is a horizontal sectional view through the device taken on the line 3—3 of FIGURE 1.
Figure 4:
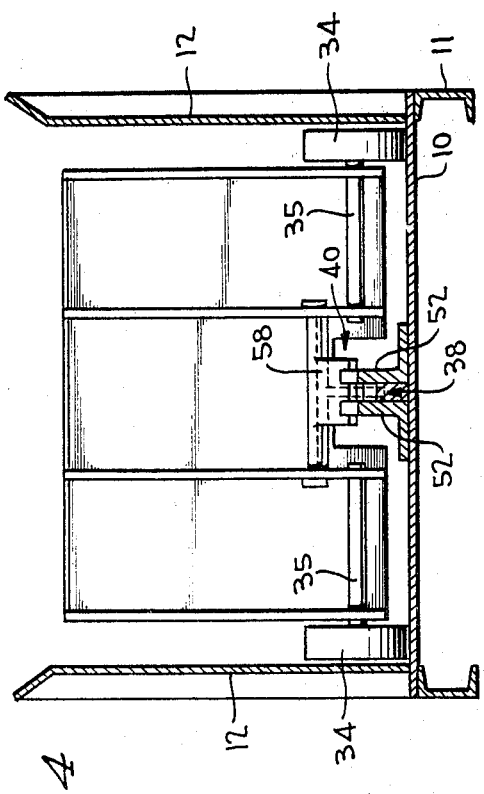
FIGURE 4 is a vertical sectional view through the device taken on the line 4—4 of FIGURE 2.

Referring now to the drawings, the reference T indicates a trench into which sugar cane is to be delivered from a cart C. The cart C includes a bottom 10, supported on a frame member 11, side walls 12, and a front end wall 14 which form a bin 16. The bin 16 is open at its rear end at 18. The frame member 11 is provided with an axle 20 and wheels 22 to enable the bin 16 to be moved along one or more parallel trenches T. Although in the embodiment illustrated, the frame member 11 is shown as supported by two wheels 22, it is to be understood that four wheels may be employed, if desired. A six inch pipe 24 is secured to and extends from the front of the frame member 11. The end of pipe 24 is provided with a tongue or hitch 26 and the hitch 26 is detachably secured to a tractor or similar vehicle coupling 28 by a bolt 30.

A truss member 32 is positioned within the bin 16 and is mounted on rollers 34 which are carried on axles 35 to facilitate its movement longitudinally of the bin 16. Supported on the truss member 32 is a transverse partition means 36, against which the sugarcane S which is to be deposited in the trenches T, rests.

A pawl and ratchet means is provided for moving the truss member 32 and associated transverse partition means 36 toward the rear end 18 of the bin 16. The pawl and ratchet means comprises a pawl and ratchet mechanism indicated generally at 38 and a reverse movement limiting mechanism indicated generally at 40.

The pawl and ratchet mechanism 38 comprises a longitudinally extending movable member 42 having teeth 44 on its upper edge 46 and a pawl 48 pivotally secured at 50 to truss member 32.

The reverse movement limiting mechanism 40 comprises a pair of spaced longitudinally extending parallel guide members 52 which are fixed to the bottom 10 of bin 16 and are provided with teeth 54 on their upper edge 56, and an arm 58 pivoted at 60 to truss member 32.

The movable member 42 is arranged to be slidably guided between the parallel guide members 52 and is actuated by a fluid power actuated servo motor 62 connected to movable member 42 by any conventional coupling 64. The motor 62 is supported on pipe 24 and receives its actuating fluid from a conventional supply and exhaust valve (not shown) and conduits 66.

A platform 68 is rigidly secured to the cart frame 11. Platform 68 extends in a rearward direction from the open rear end 18 of the cart C as well as laterally in opposite directions beyond the sidewalls 12 of bin 16. A cane confining means 70 extends between and rigidly connects each sidewall 12 of the bin 16 with the platform 68. The confining means 70, therefore, serves as a guide for the lower ends of the sugarcane S and as a brace for the platform 68.

A seat carrier member 72 is connected to platform 68 by means of hinges 74 so that the seat carrier member 72 may be pivoted at right angles to the plane of the platform 68. A plurality of pairs of transversely extending parallel slots 76, 76' are formed in the seat carrier member 72. Seat mounting means comprising a plurality of seat mounting members 78 are, respectively, supported for adjustment along the parallel slots 76, 76' by bolts or similar fastening means 80. A seat member 82 and a footrest member 84 are secured to each seat mounting member 78.

The described sugarcane planting aid is operated in the following manner. The ends of pawl 48 and pivoted arm 58 are raised above the teeth 44 and 54 so as to release the truss member 32 from the ratchet of the pawl and ratchet mechanism 38 and the teeth 54 of the reverse movement limiting mechanism. The truss member 32 and transverse partition 36 supported by the truss member are then moved to the extreme forward end of bin 16. The entire bin is then filled with sugarcane S extending from the movable transverse partition to the open rear end of the bin. The cart C is then transported to the region of the trenches T and positioned so that its wheels 22 straddle from one to three trenches. Depending on the number of trenches, up to three, that are to be supplied with sugarcane, a corresponding number of workmen take their places on seat members 82, which have been previously adjusted so that a workman seated on any one of the seat members 82 is properly positioned to deposit sugar cane into a selected trench T. The cart is then moved forwardly, slowly, along the trenches and the workmen seated on the seat members 82 deposit the sugarcane into the trenches. As the cane within the cart C becomes out of reach of the workmen seated on seats 82, the driver of the tractor or the workmen operate valves (not shown) to supply fluid to motor 62 to drive the motor in a direction that moves the movable member 42 of the ratchet mechanism rearwardly. A tooth 44, extending from movable member 42 and which is in engagement with pawl 48 drives the pawl 48 rearwardly. Rearward movement of pawl 48 causes rearward movement of the truss member 32 and transverse partition 36 on which the sugarcane S rests. As the truss member 32 moves rearwardly, pivoted arm 58 engages behind one of the teeth 54 and prevents forward movement of truss 32 when the fluid pressure which drives motor 62 rearwardly is reversed.

The footrests 84, one of which is secured to each seat mounting member, in addition to providing comfort to the workmen, serve also to brace the workmen as they withdraw sugarcane from the cart. By reason of the pivotal mounting of the seat carrier member 72, it may be pivotally moved so as to lie on platform 68. In this position, seat member 82 and footrest member 84 will be out of the way thereby reducing the possibility of damage to these members and injury to workmen.

After reading the foregoing detail description, it will be apparent that the objects set forth initially have been successfully achieved.

Accordingly, what is claimed is:

1. A sugarcane planting aid comprising a mobile cart including a bin extending longitudinally thereof having side walls and front and rear ends;
   at least the rear end of said bin being open;
   a platform including seat means extending rearwardly from said bin and extending laterally in opposite directions beyond the side walls of said bin;
   a cane confining means secured to each side of said bin and said platform restricting lateral discharge of said cane from said bin onto said platform and forming a brace for said platforms;
   transverse partition means in said bin movable longitudinally thereof so as to advance cane contained therein outwardly through said open rear end onto said platform;
   said transverse partition means being inclined downwardly and rearwardly and supported on a truss member;
   and means for moving said partition means longitudinally.

2. A sugarcane planting aid as in claim 1, wherein said means for moving said partition means longitudinally includes pawl and ratchet means.

3. A sugarecane planting aid as in claim 1, wherein said means for moving said partition means longitudinally includes a power means.

4. A sugarcane planting aid as in claim 3, wherein said means for moving said partition longitudinally includes pawl and ratchet means.

5. A sugarcane planting aid as in claim 1, wherein seat means includes a seat carrier member hinged on the rear end of said cart, seat mounting means extending from said carrier member, and support seat element means.

6. A sugarcane planting aid as in claim 5, wherein said seat mounting means is provided with footrest means.

7. A sugracane planting aid as in claim 6, wherein said seat mounting means is transversely adjustable on said carrier member.

8. A sugarcane planting aid as in claim 5, wherein said seat mounting means comprises a plurality of transversely adjustable seat mounting members and said seat element means comprises a plurality of seat members.

9. A sugarcane planting aid comprising a mobile cart including a bin extending longitudinally thereof having side walls and front and rear ends; at least the rear end of said bin being open; transverse partition means in said bin movable longitudinally thereof so as to advance cane contained therein outwardly through said open rear end; said mobile cart having at least two wheels and being provided with a hitch; the transverse partition means being inclined downwardly and rearwardly and supported on a truss member, said truss member being mounted on rollers; a pawl and ratchet means being provided to effect longitudinal movement of said transverse partition means, said pawl and ratchet means comprising a pair of spaced parallel guide members fixed relative to the sidewalls of the bin having teeth on their upper edges and a movable member slidable longitudinally between said fixed guide members having teeth on its uper edge; a fluid powdered servo motor actuating said ratchet means; a platform extending laterally, in opposite directions beyond the side walls of said bin; a cane confining means being secured to each side of said bin and said platform restricting lateral discharge of said cane from said bin onto said platform and forming a brace for said platform; a seat carrier member being hinged to said platform for pivotal movement thereof at right angles to the plane of said platform; laterally spaced pairs of slots being formed in said seat carrier member, a plurality of seat mounting members being respectively, mounted in and arranged for lateral movement relative to each pair of said spaced pairs of slots and a seat member and a foot rest member being carried by each seat mounting member.

References Cited

UNITED STATES PATENTS

| | | |
|---|---|---|
| 1,275,708 | 8/1918 | Lemay. |
| 1,492,634 | 5/1924 | Hilliard _ _ _ _ _ _ _ _ _ _ _ _ 254—105 |
| 2,622,385 | 12/1952 | Caraganis _ _ _ _ _ _ 214—83.1 XR |
| 2,704,158 | 3/1955 | Long. |
| 2,803,357 | 8/1957 | Ronfeldt _ _ _ _ _ _ _ _ _ _ _ _ 214—82 |

FOREIGN PATENTS

| | | |
|---|---|---|
| 762,574 | 11/1956 | Great Britain. |

ALBERT J. MAKAY, *Primary Examiner.*